United States Patent [19]

Kundu

[11] Patent Number: 5,812,702
[45] Date of Patent: Sep. 22, 1998

[54] SYSTEM AND METHOD FOR ENHANCEMENT OF CODED IMAGES USING ADAPTIVE SPATIAL FILTERING

[75] Inventor: Amlan Kundu, Lafayette, Colo.

[73] Assignee: U S West, Inc., Englewood, Colo.

[21] Appl. No.: 561,679

[22] Filed: Nov. 22, 1995

[51] Int. Cl.$^6$ .............................. G06K 9/36; G06K 9/40; G06K 9/46

[52] U.S. Cl. ........................ 382/260; 382/261; 382/235

[58] Field of Search .................................... 382/261, 262, 382/231, 233, 235, 260

[56] References Cited

U.S. PATENT DOCUMENTS

| 5,218,649 | 6/1993 | Kundu et al. | 382/180 |
| 5,327,509 | 7/1994 | Rich | 382/108 |

OTHER PUBLICATIONS

"Digital Step Edges from Zero Crossing of Second Directional Derivatives, Robert M. Haralick, IEEE, 1984".
Liu et al "Adaptive Post–Processing Algorithms for Low Bit Rate Video Signals", IEEE, Apr. 1994.

Primary Examiner—Leo H. Boureau
Assistant Examiner—Daniel G. Mariam
Attorney, Agent, or Firm—Judson D. Cary

[57] ABSTRACT

Pixels in a low bit-rate encoded image are categorized into two or more categories. In one embodiment three pixel categories are used: 1) pixels belonging to quasi-constant (QC) regions where the pixel intensity values vary slowly (e.g., pictorial portions), 2) pixels belonging to textured regions which are characterized by many small edges and thin-line signals (e.g., text portions), and 3) pixels belonging to dominant-edge (DE) regions which are characterized by few sharp and dominant edges (e.g., edge portions). In one embodiment DE pixels are categorized first, then QC and textural pixels are distinguished from the remaining pixels using the number of zero-crossings among the pixels and a threshold. Conventional spatial filters that are well suited for each pixel category type are then used to enhance each region of the image. In one embodiment, various combinations of spatial filters are used to enhance the image.

15 Claims, 9 Drawing Sheets

Figure 8

SYSTEM AND METHOD FOR ENHANCEMENT OF CODED IMAGES USING ADAPTIVE SPATIAL FILTERING

BACKGROUND OF THE INVENTION

1. Field of the Invention

This invention relates to enhancement of computer encoded images, and more particularly to a system and method for enhancing low bit-rate computer encoded images (e.g., JPEG) using adaptive spatial filtering.

2. Description of the Related Art

Low bit-rate coding schemes (e.g., 0.75 bits or less per pixel) have proven to be extremely useful in coding image data for storage on electronic media. The Joint Photographic Experts Group (JPEG) specified coder is a common low bit-rate coding scheme. Low-bit vector quantization and low-bit fractal coding are other coding schemes. However, most low bit-rate image coding schemes produce a block effect (e.g., the blocks of pixels can be seen), and/or the edges display a wave-like or fuzzy appearance. Low bit-rate vector quantized images produce similar block effects and generally have jagged edges after reconstruction. Block effects are also prominent in low bit-rate fractal coding.

Post-processing algorithms attempt to reduce these visual defects by using various smoothing techniques. However, because of the ad-hoc nature of the problem, a constant smoothing function generally fails to address spatial and characteristic differences in each specific image. For example, pictorial portions of an image may need considerable smoothing to reduce block effects. Textual portions of the image need little or no smoothing, and, over-smoothing of texture can create additional visual defects. And, edges require special filtering that preserve the edges.

It would be beneficial to have an image post-processing method that distinguishes between pixels, texels, and/or edgels, and can adapt appropriate image enhancement techniques for improved, clearer, or enhanced images.

SUMMARY OF THE INVENTION

Pixels in a low bit-rate encoded image are categorized into two or more categories. In one embodiment three pixel categories are used: 1) pixels belonging to quasi-constant (QC) regions where the pixel intensity values vary slowly (e.g., pictorial portions), 2) pixels belonging to textured regions which are characterized by many small edges and thin-line signals (e.g., text portions), and 3) pixels belonging to dominant-edge (DE) regions which are characterized by few sharp and dominant edges (e.g., edge portions). In one embodiment DE pixels are categorized first, then QC and textural pixels are distinguished. Conventional spatial filters that are particularly well suited for each pixel category are then used to enhance each region of the image. In one embodiment, various combinations of spatial filters are used to enhance the image.

DESCRIPTION OF THE PREFERRED EMBODIMENTS

Figure 1:
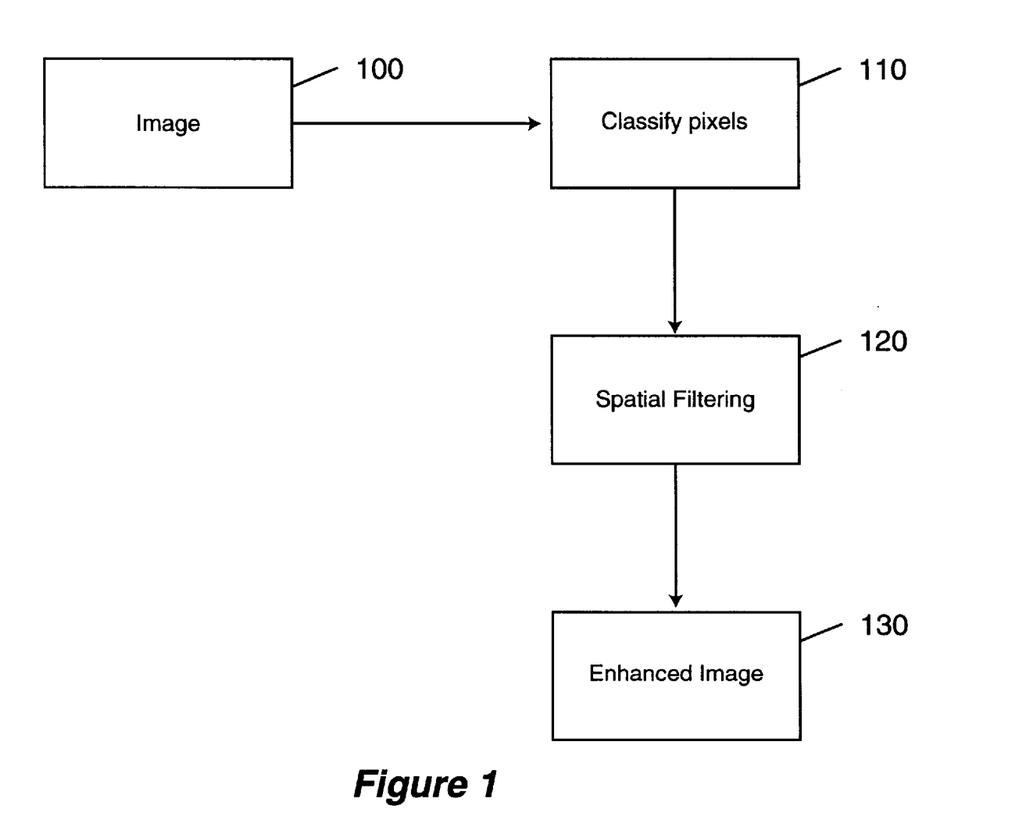
FIG. 1 is a high-level flowchart of one embodiment of the image enhancement method of the present invention.

FIG. 1 is a high-level flow chart illustrating the method of the present invention. Image 100 is a low-bit pixel coded image, for example an image encoded at less than 1 bit per pixel, e.g., 0.75 bits per pixel. The JPEG encoding scheme can be used as a low-bit encoding scheme. Low-bit vector quantization and low-bit fractal coding are other encoding schemes. Each pixel in image 100 is classified 110 into one or more categories or regions. For example, in a preferred embodiment, each pixel is classified into one of three pixel categories: quasi-constant (QC), textured, and dominant-edge (DE). In another embodiment, some pixels may be classified into more than one category. Conventional spatial filters that are well adapted for each category type 120 are applied to each category, thus generating enhanced image 130.

Pixel Categorization

Figure 2:
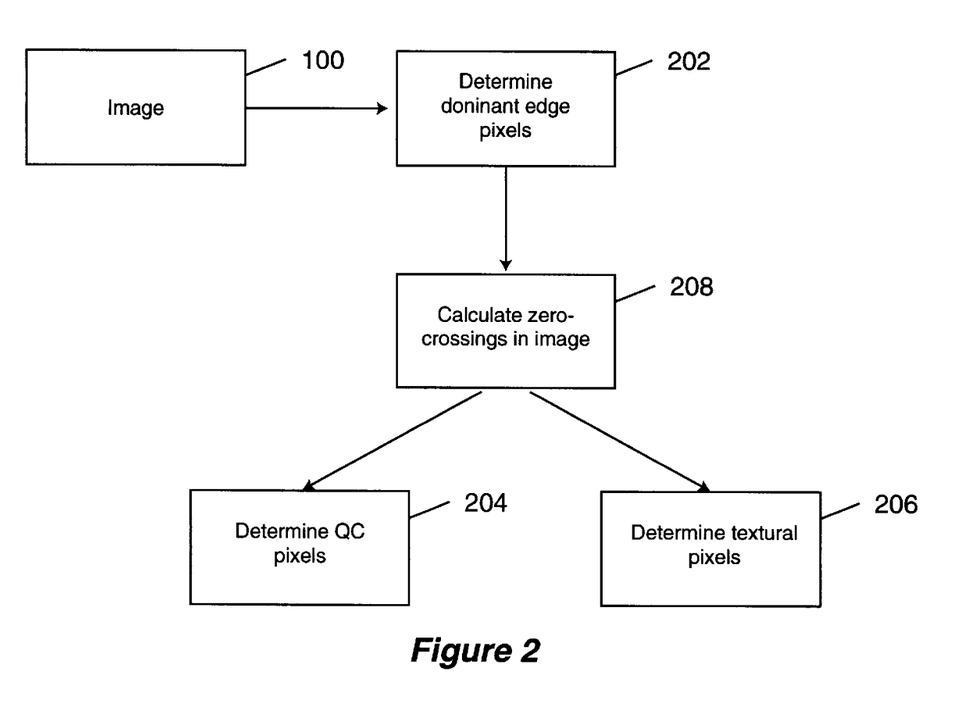
FIG. 2 is a high-level flowchart of one embodiment of the pixel classification method.

Referring now to FIG. 2, in a preferred embodiment, DE pixels in image 100 are determined using conventional edge detection methods 202. As discussed below, QC pixels 204 and textural pixels 206 are distinguished from each other by calculating a zero-crossing measure 208 of image 100.

Figure 3:
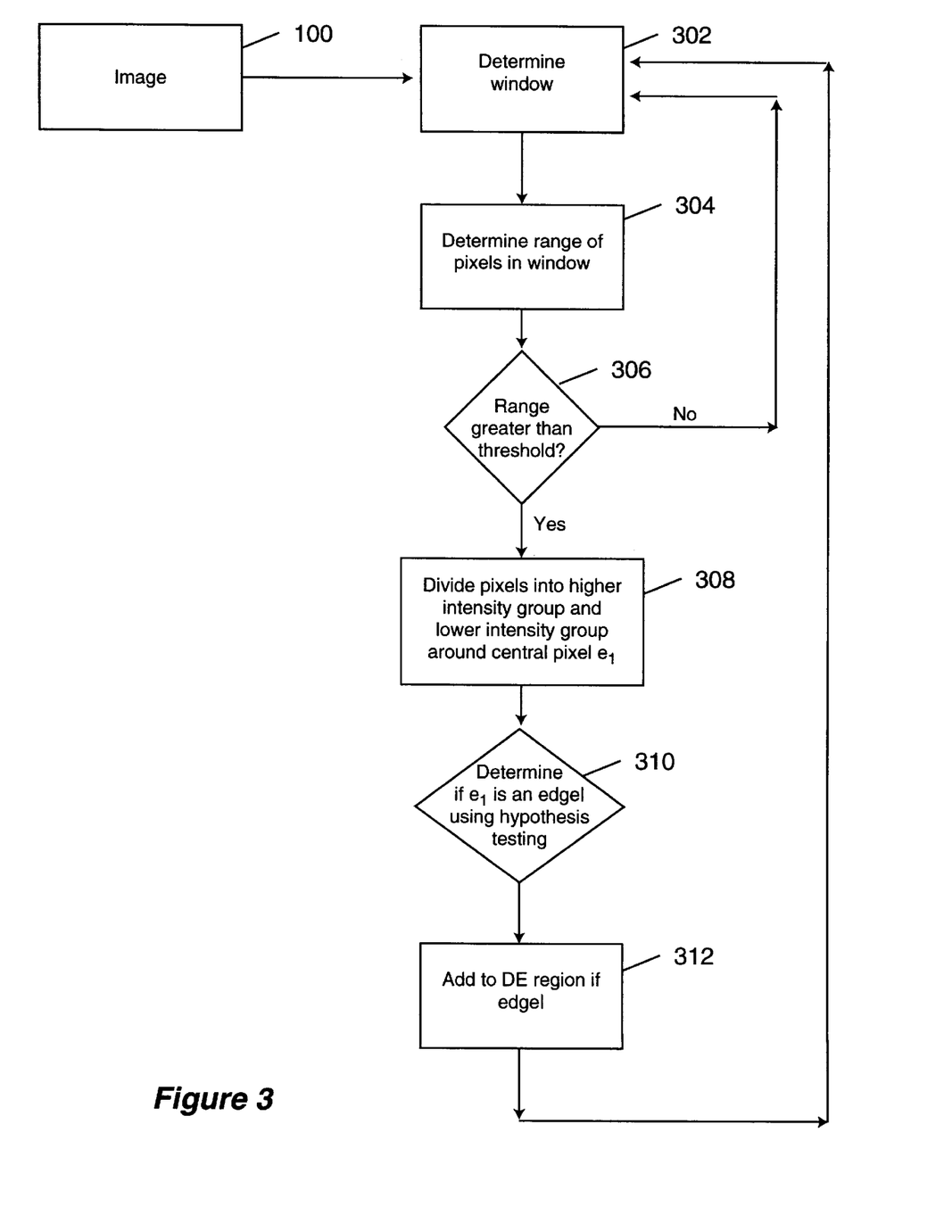
FIG. 3 is a flowchart of one embodiment of the dominant edge (DE) pixel classification method.

Pixels in the DE category (also called edgels) may be detected using several conventional edge detection methods 202. Referring now to FIG. 3, in a preferred embodiment, a relatively less computationally expensive edge operation can be used as defined by:

$$edge\_map = H \alpha T \alpha R(input\_image).$$

A sliding window 302 in image 100 is defined (e.g., 3×3 pixel window). For each sliding window 302, the operator R computes a measure of the range of pixels inside the window 304. If the range is bigger than a threshold $t_1$, the central pixel of the window is considered likely to be an edgel, $e_1$, otherwise the next window 302 is examined 306. The threshold $t_1$ is determined, for example by the range of pixel values inside the window 302. The operator T divides the pixels centered around $e_1$ into two groups-a group of higher intensity and a group of lower intensity values 308. This stage is controlled by another threshold $t_2$. The threshold $t_2$ is determined, for example, by the range of the strength of the edges to be detected.

Let N be the number of pixels belonging to the group of higher intensity values. For most cases, N follows a standard normal distribution. The operator H uses a conventional hypotheses testing paradigm to determine whether or not the central pixel $e_1$ is an edgel in the DE category 310 (e.g., one hypothesis is that an edgel is present, another hypothesis is that it is not; the better hypothesis will prevail). If an edgel is indicated, it is added to the DE region 312. The process is then repeated for each window 302 in image 100. See generally, A. Kundu and S. K. Mitra, "*Image Edge Extraction Using A Statistical Classifier Approach,*" IEEE Trans.

on PAMI, PAMI-9, 4, 569–577, 1987. Other conventional edge detection methods can also be employed by the present invention, see for example, J. Canny, "A Computational Approach to Edge Detection," IEEE Trans. on PAMI, Vol. 8, pp. 679–698, 1986.

Figure 4:
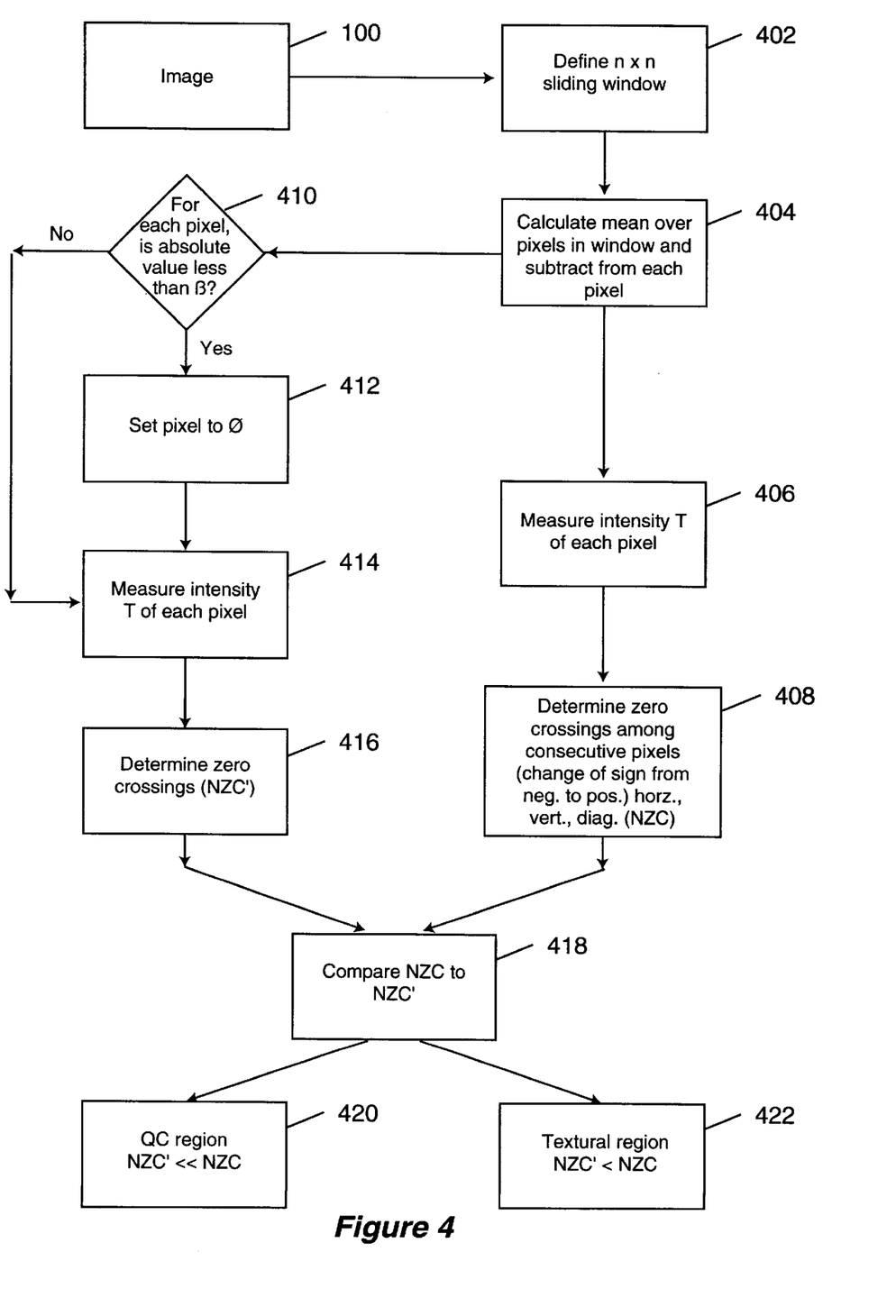
FIG. 4 is a flowchart of one embodiment of the textural and quasi-constant (QC) pixel classification method.

Pixels belonging to the quasi-constant (QC) and textural regions are separated from each other by determining the number of zero-crossings and using a thresholding operation. Referring now to FIG. 4, in a preferred embodiment, a sliding window of n×n pixels is defined 402. The mean is calculated over all the pixels in the window, and then subtracted from each pixel 404. The intensity value $T_i$ of each pixel is then measured 406. Some pixels will have a positive intensity, and others a negative intensity. The change of sign in the intensity values of two consecutive pixels in any particular direction is defined as a zero-crossing in that direction. The number of zero-crossings (NZC) are computed along each row, along each column, and along the two diagonal directions 408.

Both the QC and the textural regions have a relatively large value for the NZC parameter. However, the NZC parameter is used along with several possible local standard deviation (LSD) measures to discriminate between the QC and the textural regions. In one embodiment, a simple parameter reflecting LSD is used. Namely, after the subtraction of the local mean from each pixel, if the absolute value of any pixel inside the window is less than a pre-selected threshold value, $\beta$ 410 that pixel value is set to zero 412 (the threshold $\beta$ is determined, for example, by the method described below). If the pixel is greater than $\beta$ the pixel value remains unchanged. The NZC parameter is recomputed after this thresholding operation 414, 416. In a QC region, the new NZC value, NZC', is generally much less than the original NZC value 418, 420. In a textural region, NZC' is generally only slightly less than the original NZC value 418, 422. Thus, in one embodiment, NZC' is used to discriminate between the QC and the textural regions.

According to one embodiment of the invention, the method for determining QC and textual regions is a modification to the a-level crossing problem in stochastic process theory. Since the $\beta$-crossings, NZC', are counted along each one dimensional direction (1-D), the intensity values $T_i$ along each 1-D is the realization of a stochastic process where each random variable has a zero mean. It is assumed that the process is normal and differentiable. Then the level-crossing density (for level a) is given by:

$$\lambda_a = 1/\pi \sqrt{(-R''(0)/R(0))e^{-a^2/2R(0)}}$$

where $R(\tau)$ is the autocorrelation of the process. The objective is to find a (or $\beta$) such that (under mild assumptions) the number of level crossings for textural regions is guaranteed to be much higher than the number of level crossings for the QC regions. Let $R_1(\tau)$ be the autocorrelation of the process when the region under consideration is a quasi-constant region. Let $R_2(\tau)$ be the autocorrelation of the process when the region under consideration is a textural region. It is assumed that $R_1(\tau)$ has the form $c_1 f_1(\tau)$ where $f_1(0)=1, f_1(\infty)=0$ and $f_1'(\tau)$ is negative. It is also assumed that $R_2(\tau)$ has the form $c_2 f_2(\tau) \cos(\omega \tau)$ where $f_2(0)=1, f_2'(\infty)$ is negative. To be valid autocorrelation functions, $f_1(.)$ and $f_2(.)$ approach zero with $|\tau| \to \infty$. The periodic component of $R_2(\tau)$ is a simplistic assumption but understates the textural characteristics well because the autocorrelation in a textural region does not fall off monotonically as it does in a QC region. If A is defined as:

$$\Lambda = \frac{\lambda_a|\text{texture}}{\lambda_a|QC \text{region}}$$

The a-level crossings of the textural region will be markedly more when the following constraint is satisfied.

$$\beta^2 = a^2 > 3c_1/2$$

Here, $c_1$ is essentially the variance of the QC region. In general, it can be assumed that the variance rarely exceeds 4% of the dynamic range of the pixels in the image. Thus, for a dynamic range of 0–255, $\beta$ is approximately 12.

Figure 4A:
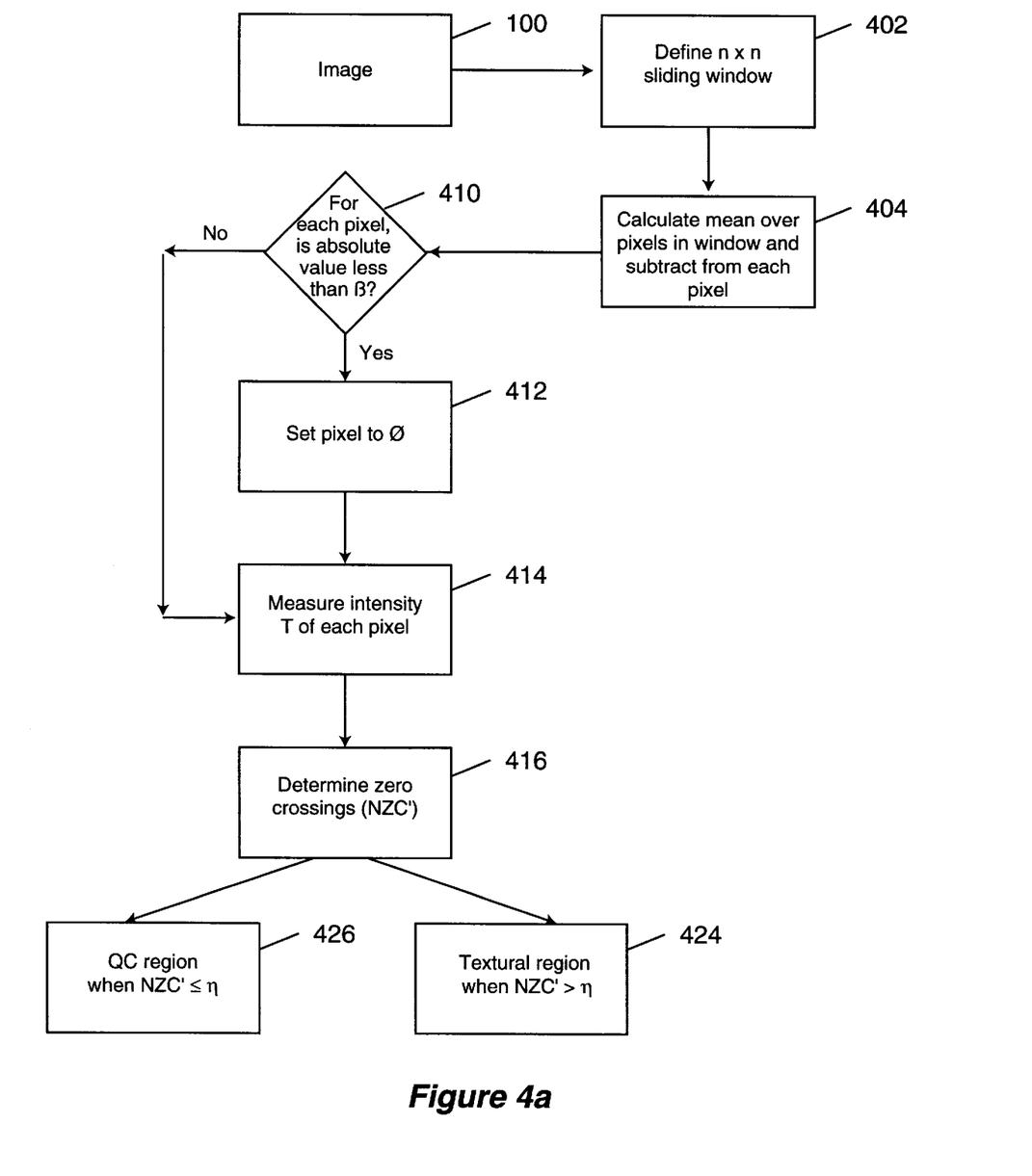
FIG. 4A is a flowchart of an alternative embodiment of the textural and quasi-constant (QC) pixel classification method.

A modified embodiment for distinguishing between textural and QC regions is shown in FIG. 4A. The pixel classification method can be performed as follows:

1) An edge operator is used to locate the dominant edges as discussed above (see, e.g., FIG. 3 and accompanying text).
2) NZC' is determined as discussed above (100, 402, 404, 410, 412, 414, 416).
3) If NZC' is greater than $\eta$ (see below), that pixel is defined as a texel 424. Otherwise, the pixel belongs to a QC region 426.

$\eta$ is determined as follows. Over a QC region, each pixel value follows a Gaussian distribution $N(0,\sigma)$ (by assumption). $\beta$ is approximately equal to $1.22\sigma$, and the probability that a pixel is not set to zero is approximately 0.125. For each non-zero pixel, the maximum contribution to NZC' is 4 as the pixel could be counted 4 times as part four directional 1-D countings (horizontal, vertical and two diagonal). Thus, a good first approximation value of $\eta$ is $$\eta = n^2 \times 4 \times 0.125$$

Where, $n^2$ is the window size. In a preferred embodiment, the window size is 5×5, and an $\eta$ in the range of 10–12 is adequate.

Adaptive Spatial Filtering for Enhancement

Figure 5:
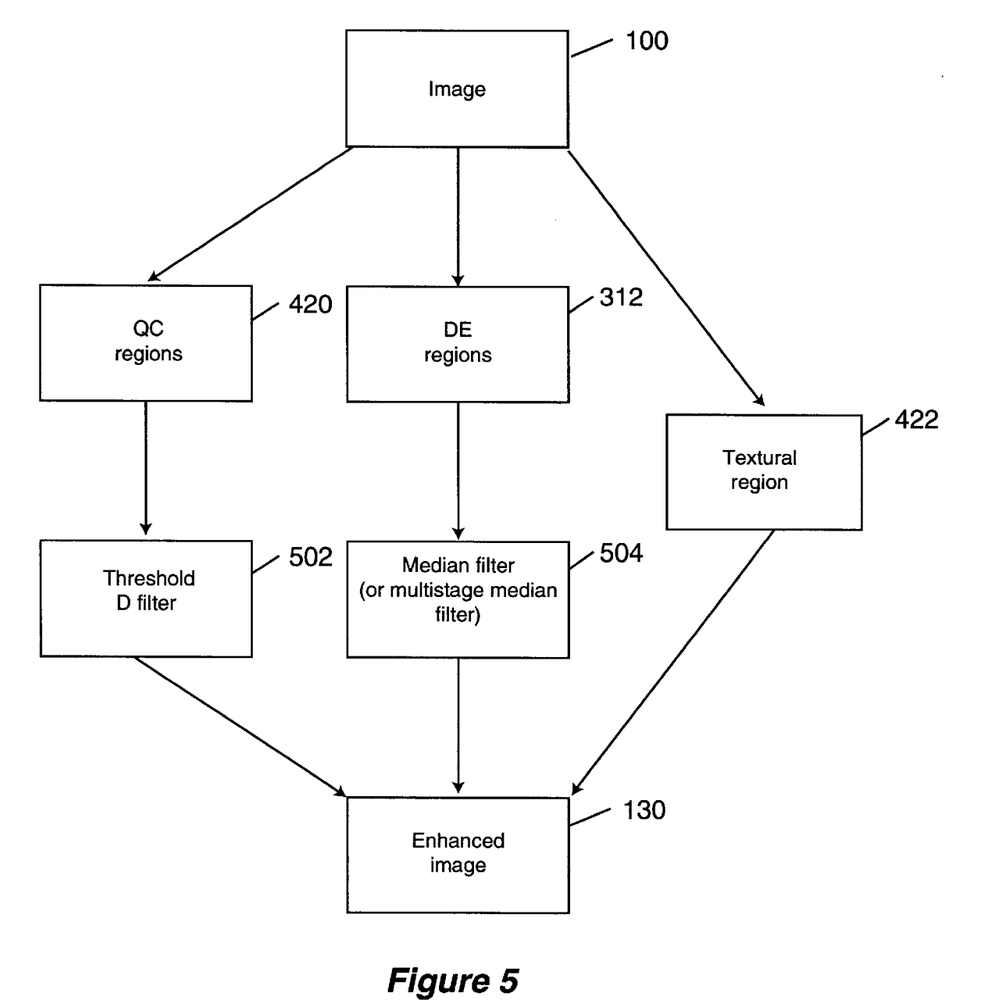
FIG. 5 is a flowchart of one embodiment of the image enhancement method.

According to the present invention, various conventional spatial filtering methods can be employed that are targeted to enhance each pixel category type. Referring now to FIG. 5, one embodiment of a method for applying spatial filtering to pixel categories is shown. QC regions are generally prone to noise with a short-tailed distribution in QC-type blocks introduced by the low-bit rate encoding (e.g., JPEG). In a preferred embodiment, the Hodges-Lehman D filter is used in the QC regions for smoothing out noise with a short-tailed distribution 502. See generally, P. J. Bickel and J. L. Hodges, "The Asymptotic Theory of Galton's Test and a Related Simple Estimate of Location," Annals of Mathematical Statistics, 38, pp. 73–89, 1967.

According to the Hodges-Lehman D filter, let $X_i, 1 \leq i \leq n$ be a sample from a population with distribution $F(x,\theta)$ and density $f(x,\theta)$ where $f(.)$ is symmetric about zero, continuous, and strictly positive on the convex support of F, $[x:0 \leq F(x)<1]$. Denote $X_1, \ldots, X_n$ as the order statistics of the sample. Let $n=2m$ or $2m-1$. In either case, the D filter output is defined as:

$$D_n(x_1, \ldots, x_n) = \text{median}_{1 \leq i \leq m}(X_i + X_{(n-i+1)}) * \frac{1}{2}.$$

Under the thresholded D filter, pixels with intensity values in the range (c−Range) and (c+Range) are selected. The D filter is applied only to the pixels within this range. Usually, c is the intensity value of the central pixel in the window.

Over a DE region 312, the noise profile generally appears as a long-tailed distribution. In one embodiment, the conventional median filter is used to smooth out such long-tailed noise distribution 504. The median filter also preserves the edges in the image. In a preferred embodiment, a 5×5 or a 7×7 median filter is used for smoothing regions around the dominant edges.

Alternatively, the Multistage Median Filtering can be used to enhance the DE regions 504. Consider a n×n window with four 1-pixel wide subwindows along horizontal, vertical and two diagonal directions. The windows are designated $W_1, \ldots, W_4$. Let $z_i$ be equal to median (all pixels in $W_i$). The maximum and the minimum of these four median output are computed as $y_{max}(n)$ and $y_{min}(n)$. Let a(n) be the central pixel. Then the output of the multistage median filter is defined as:

$$\text{output} = \text{median}\ (y_{max}(n),\ y_{min}(n),\ a(n)).$$

In one embodiment, no additional spatial filtering is performed on the textural region 422. And, in some cases, spatial filtering of textural portions can make the image appear to be "too smooth."

Figure 6:
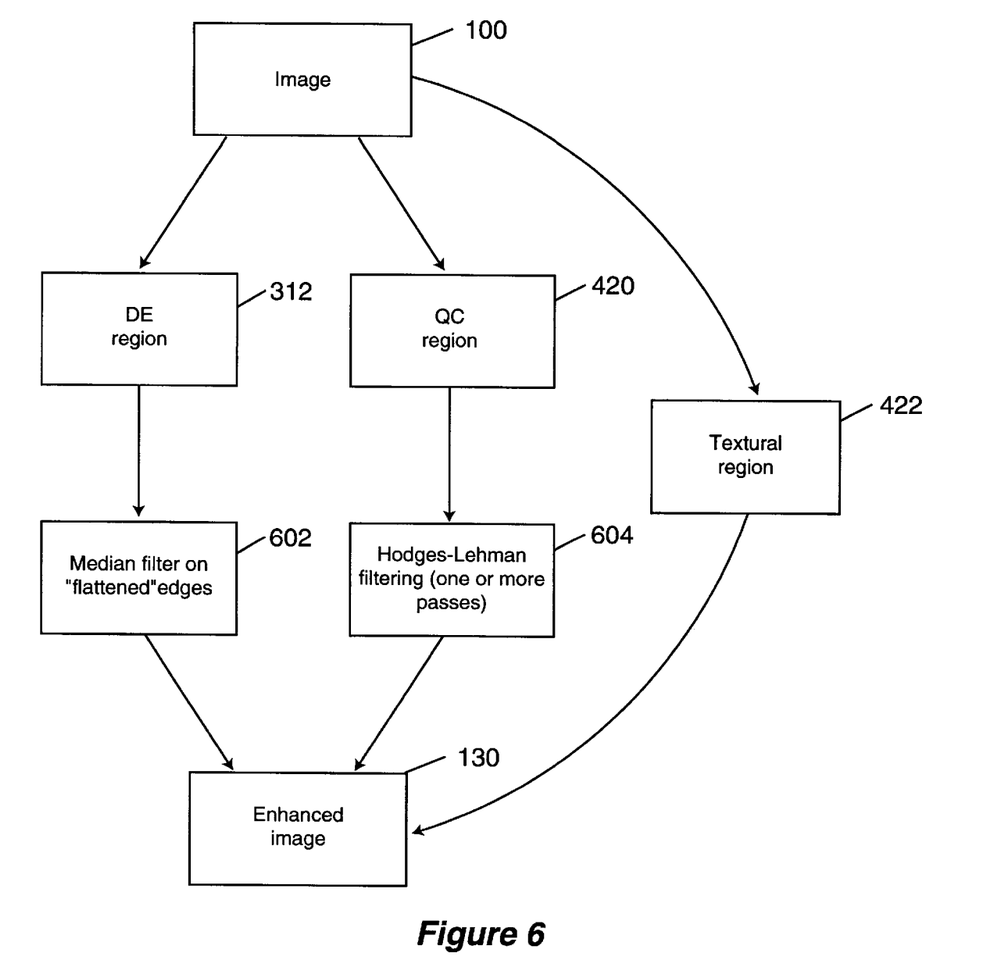
FIG. 6 is a flowchart of an alternative embodiment of the image enhancement method.

Combinations of these spatial filters, or other filtering techniques, can be employed on the image. Referring now to FIG. 6, in a preferred embodiment, a 5×5 or 7×7 median filtering is used to smooth the edge points (DE regions) where the preceding and the succeeding points (in a raster scan sense) of any edge point are also considered as edge points (called edge "flattening") 602. Edge flattening is performed by a morphological dilation operation using a horizontal line element with three elements. The median filtering is followed by one or two passes of 3×3 D filtering over the QC regions 604. Filtering over the textural regions in this embodiment is not performed, and, in some cases, any filtering of the textural regions may make the text appear too smooth.

Figure 7:
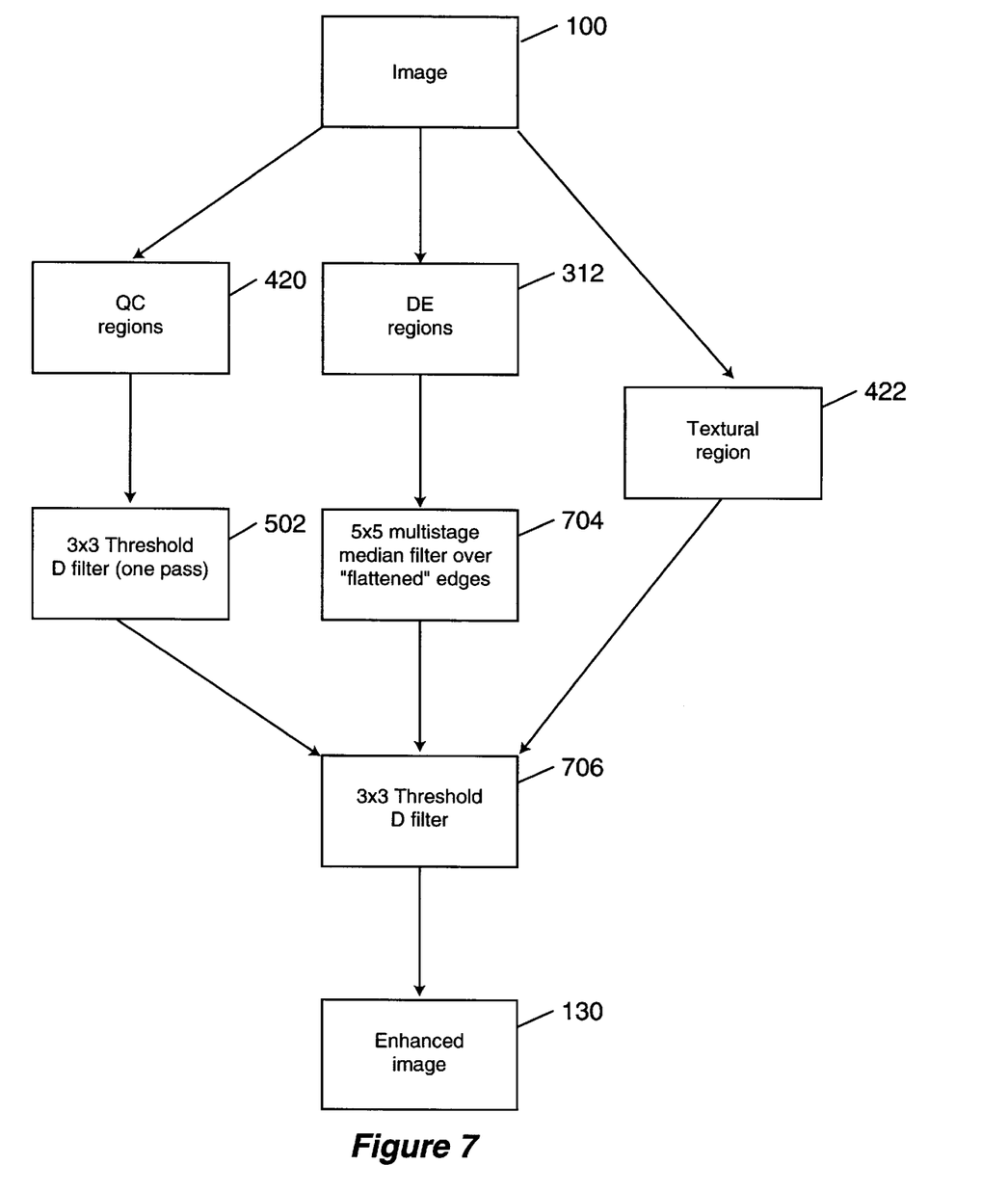
FIG. 7 is a flowchart of an alternative embodiment of the image enhancement method.

In an alternative combination of filtering techniques, one pass of a 3×3 D filtering over the QC regions 502 is followed by a 5×5 multi-stage median filtering of the edge points (where the edges have been flattened to include the preceding and the succeeding points) 704. Then, one additional filtering pass is made over the entire image using a 3×3 thresholded D filtering 706.

For color images, the individual R, G and B components are filtered separately using the schemes outlined above. Three-level pixel categorization is obtained from a greyscale image Y, where Y is defined as Y=0.2999 R+0.587 G+0.114 B.

Figure 8:
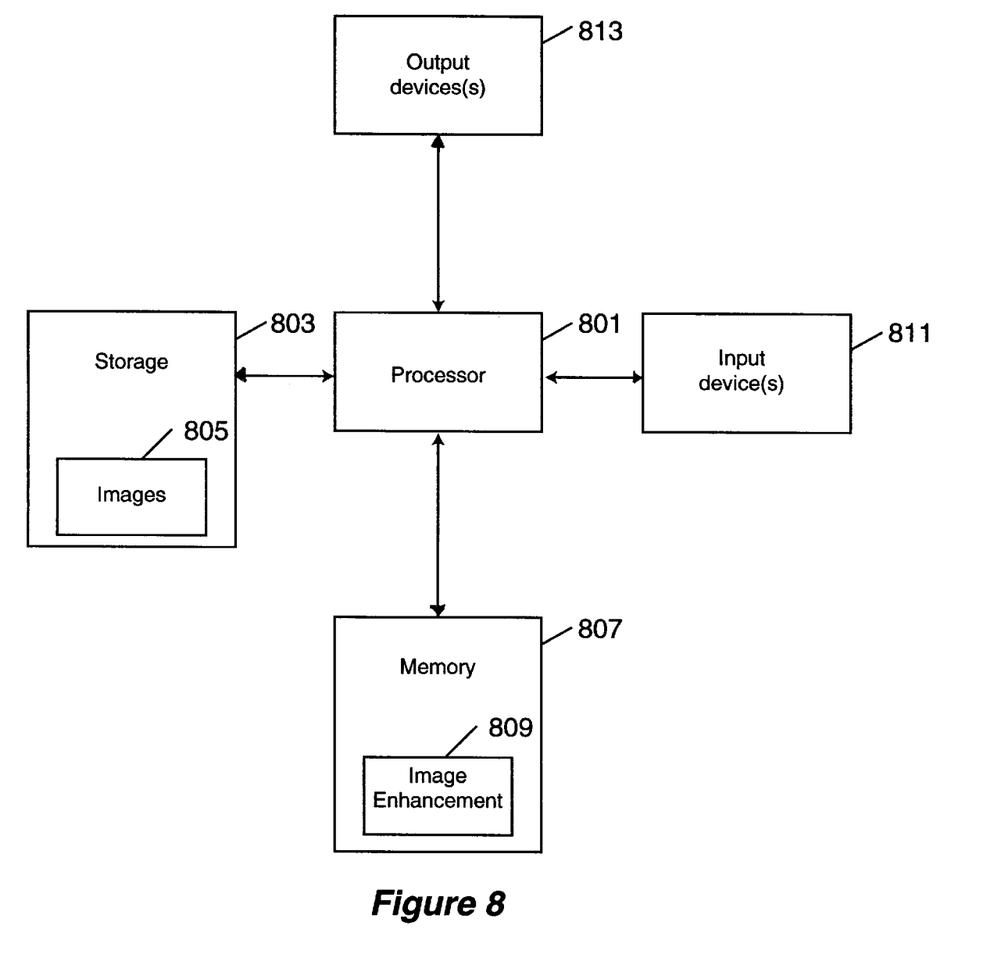
FIG. 8 is a block diagram of one embodiment of the image enhancement system of the present invention.

Referring now to FIG. 8, there is shown a block diagram of hardware and software elements of a typical implementation of one embodiment of the present invention. Processor 801 is a conventional engineering workstation processor or other computer central processing unit (CPU), such as an Intel 80×86 series, Intel Pentium, or Motorola 68000 series processor. Processor 801 may also be coupled to other processors accessible over conventional communications channels or buses (not shown).

Processor 801 is conventionally coupled to storage 803 which may be magnetic disk storage, a CD storage unit, or other conventional computer data storage unit. Storage 803 may also be coupled to other storage units accessible over conventional communications channels or buses (not shown). Storage 803 comprises image storage 805 for electronically storing images 100. Such images 100 are retrievable by processor 801.

Processor 801 is also conventionally coupled to memory 807 which is a random access memory (RAM) unit or other conventional computer memory. Memory 807 preferably comprises image enhancement program 809. Image enhancement program 809 comprises instructions executable on processor 801 to perform the various functions of the present invention (described above). Memory 807 and/or storage 803 is modified by the implementation of image enhancement program 809 in memory 807. Image enhancement program 809 may alternatively be stored in storage 803 and accessed by processor 801 in memory 807 when required.

Conventional input devices 811 such as a mouse, keyboard, joystick, drawing tablet, touchscreen, and/or light pen, are also coupled to processor 801. Conventional output devices 813, such a computer monitor or display, is coupled to processor 801.

In a preferred embodiment, the invention may be implemented on a commercially available computer system such as: IBM/Microsoft Windows, Apple/Apple System OS, Sun/Sun OS, HP/XWindows/MOTIF, VAX/VMS, and the like.

I claim:

1. A method for enhancing a low bit-rate encoded image, the method implemented on a computer having a memory and comprising the steps of:

receiving a low bit-rate encoded image comprising pixels;

classifying said pixels into a first, a second, and a third pixel category, wherein the first, second, and third pixel categories are quasi-constant, textural, and dominant edge, respectively, and wherein the step of classifying comprises the substeps of:

setting the value of selected pixels in the received low bit-rate encoded image to zero to form a modified image;

determining an a-level zero-crossing measurement as a function of the pixels in the modified image and the pixels in the received low bit-rate encoded image; and using the a-level zero-crossing measurement to classify said pixels into the quasi-constant and textural categories;

applying a first enhancement method to the pixel in the quasi-constant category; and applying a second enhancement method to the pixels in the dominant-edge category;

whereby an enhanced image is generated.

2. The method of claim 1, wherein the low bit-rate encoded image is selected from the group consisting of a JPEG encoded image, a low-bit vector quantization encoded image, and a low-bit fractal encoded image.

3. The method of claim 1, wherein each of said pixels is classified into one of the first, second, and third pixel catagories.

4. The method of claim 1, wherein a pixel is classified into two or more of the pixel categories.

5. The method of claim 1, wherein the quasi-constant category comprises pixels, the textural category comprises texels, and the dominant edge category comprises edgels.

6. The method of claim 1, wherein the step of classifying comprises the steps of:

determining pixels belonging to the dominant edge category from said pixels in the received low bit-rate encoded image; and determining pixels in the quasi-constant category and the textural category from remaining pixels in the received low bit-rate encoded image.

7. The method of claim 1, wherein the step of classifying further comprises the substeps of:

determining a zero-crossing measurement as a function of the pixels in the received low bit-rate encoded image; and comparing the a-level zero-crossing measurement and the zero-crossing measurement;

wherein, the substep of using the a-level zero-crossing measurement to classify said pixels is performed as a function of the comparing substep.

8. The method of claim 1, wherein the step of classifying further comprises the substeps of:

determining a threshold value;

wherein, the substep of using the a-level zero-crossing measurement to classify said pixels is performed as a function of the a-level zero-crossing measurement and the threshold.

9. The method of claim 1, wherein the first enhancement method comprises the step of:

enhancing pixels in the quasi-constant category using a thresholded D-filter.

10. The method of claim 1, wherein the second enhancement method comprises the step of:

enhancing pixels in the dominant edge category using a median filter.

11. The method of claim 1, wherein the second enhancement method comprises the step of:

enhancing pixels in the dominant edge category using a multi-stage median filter.

12. The method of claim 1, wherein:

the second enhancement method comprises enhancing pixels in the dominant edge category using a multi-stage median filter to produce enhanced dominat edge pixels;

the first enhancement method comprises enhancing the quasi-constant category using a thresholded D-filter to produce enhanced quasi-constant pixels and the method further comprises the step of enhancing the enhanced dominat edge pixels, the enhanced quasi-constant pixels, and the pixels in the textural category using a thresholded D-filter.

13. Computer memory programmed to enhance a low bit-rate encoded image, the program comprising the steps of:

receiving a low bit-rate encoded image comprising pixels;

classifying said pixels into a first, a second, and a third pixel category, wherein the first, second and third pixel categories are quasi-constant, textural, and dominant edge, respectively, wherein the step of classifying comprises the substeps of:

setting the value of selected pixels in the received low bit-rate encoded image to zero to form a modified image;

determining an a-level zero-crossing measurement as a function of the pixels in the modified image of the pixels in the received low bit-rate encoded image;

determining a threshold value; and classifying pixels in the quasi-constant category and pixels in the textural category as a function of the a-level zero-crossing measurement and the threshold;

applying a first enhancement method to the pixel in the quasi-constant category; and applying a second enhancement method to the pixels in the dominant-edge category;

whereby an enhanced image is generated.

14. A computer storage device having a program for enhancing a low bit-rate encoded image, the program comprising the steps of:

receiving a low bit-rate encoded image comprising pixels;

classifying said pixels into a first, a second, and a third pixel category, wherein the first, second, and third pixel category, wherein the first, second and third pixel categories are quasi-constant, textural, and dominant edge, respectively, wherein the step of classifying comprises the substeps of:

determining a zero-crossing measurement as a function of the pixels in the reveived low bit-rate encoded image;

setting the value of selected pixels in the received low bit-rate encoded image to zero to form a modified image;

determining an a-level zero-crossing measurement as a function of the pixels in the modified image of the pixels in the received low bit-rate encoded image;

comparing the zero-crossing measurement and the a-level zero-crossing measurement; and classifying pixels in the quasi-constant category and pixels in the textural category as a function of the comparing substep;

applying a first enhancement method to the pixels in the quasi-constant category; and applying a second enhancement method to the pixels in the dominant edge category;

whereby an enhanced image is generated.

15. The method of claim 1, the method further comprising the step of applying a third enhancement method to the pixels in the textural category.

* * * * *